United States Patent [19]
Passon

[11] 3,757,913
[45] Sept. 11, 1973

[54] BRAKE ACTUATED THROTTLE CLOSURE SYSTEM

[75] Inventor: Philip J. Passon, Rochester, Mich.

[73] Assignee: General Motors Corporation, Detroit, Mich.

[22] Filed: June 8, 1972

[21] Appl. No.: 260,774

[52] U.S. Cl.......... 192/3 R, 123/97 B, 123/198 DB, 74/865
[51] Int. Cl...................... B60k 29/02, B60k 21/00
[58] Field of Search................. 192/3 R, 3 TR, 3 T; 123/198 D, 108 DB, 103 E

[56] References Cited
UNITED STATES PATENTS

| | | | |
|---|---|---|---|
| 2,066,667 | 1/1937 | Bellis | 192/3 T X |
| 2,139,569 | 12/1938 | Alvarado | 192/3 R |
| 2,183,354 | 12/1939 | Lange | 192/3 R X |
| 2,229,055 | 1/1941 | Dick | 192/3 R |
| 3,876,877 | 3/1959 | Selyem | 192/3 R |
| 2,642,166 | 6/1953 | Strauss | 192/3 T |

Primary Examiner—Benjamin W. Wyche
Attorney—F. W. Christen, R. L. Phillips et al.

[57] ABSTRACT

First and second throttle levers are coupled to normally move conjointly with each other by a scissor spring biasing the levers in opposite directions on a throttle shaft carrying a carburetor throttle valve. The first throttle lever is fixed to the throttle shaft, and the second throttle lever comprises a part of the vehicle throttle pedal linkage for normally controlling the position of the throttle valve. The first throttle lever is loosely connected to a vacuum motor to permit normal movement of the throttle pedal linkage and is pivoted in a throttle velve closing direction when the vacuum motor is actuated with engine vacuum communicated when a vehicle brake pedal opens a vacuum valve. Should the second throttle lever be prevented from moving in the closing direction with the first, actuation of the vacuum motor overcomes the bias of the scissor spring and assures the return of the throttle valve to its idle position.

5 Claims, 7 Drawing Figures

Patented Sept. 11, 1973

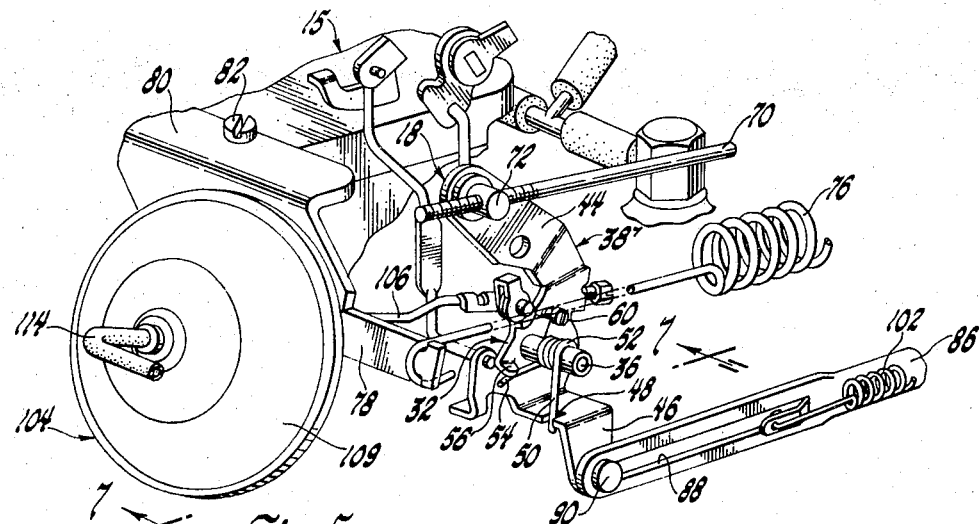
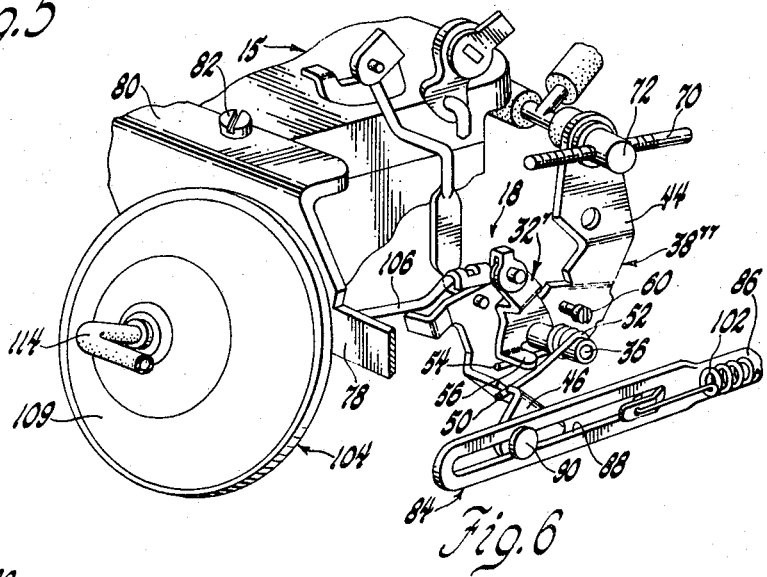
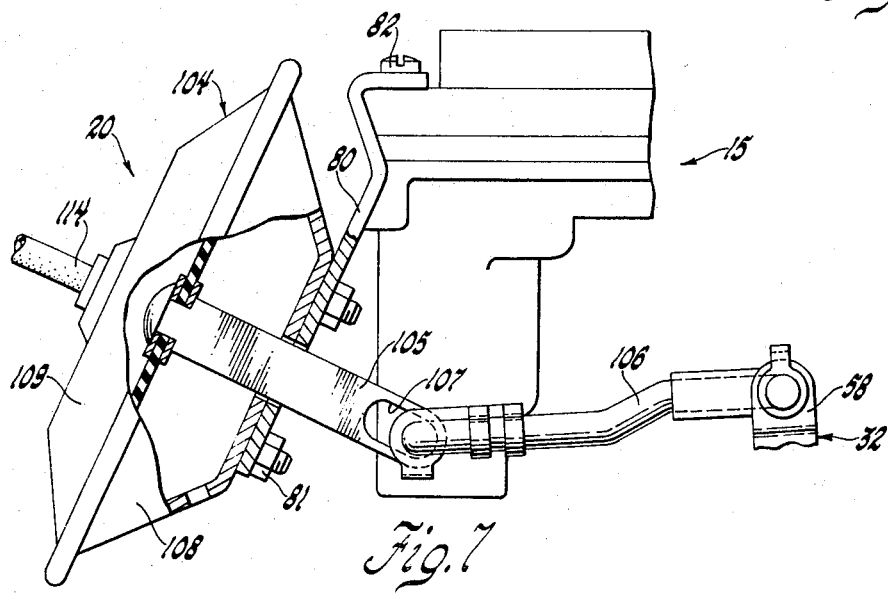

BRAKE ACTUATED THROTTLE CLOSURE SYSTEM

This invention relates to throttle controls for internal combustion engine carburetors and more particularly to a throttle control for controlling the position of a throttle valve when normal control of the valve by the vehicle throttle pedal linkage is prevented.

The present invention provides a throttle control having first and second throttle levers that are coupled to normally move conjointly with each other by a scissor spring biasing the levers in opposite directions on a throttle shaft carrying a throttle valve of an internal combustion carburetor. The first throttle lever is fixed to the throttle shaft, and the second throttle lever is a part of the vehicle throttle pedal linkage for normally controlling the throttle valve. A vacuum motor is loosely connected to the first throttle lever through a first lost motion linkage permitting normal movement of the first lever with normal movement of the throttle linkage and is actuated with engine vacuum communicated when a vehicle brake pedal opens a vacuum valve. The vacuum motor then first takes up the slack in the lost motion linkage and thereafter pivots the first throttle lever to return the throttle valve to its idle position, overcoming if necessary the bias of the scissor spring should the second throttle lever for some reason be prevented from moving in the closing direction with the first throttle lever. One of the throttle levers is also connected to move a transmission downshift linkage for normally controlling the downshift of an automatic transmission from a higher to a lower drive ratio when the throttle valve is suddenly opened by the throttle pedal linkage. The transmission downshift linkage includes a second lost motion linkage for permitting normal movement of the throttle levers in the closing direction should the downshift linkage be prevented from moving. A downshift spring having a bias less than and opposing that of the scissor spring normally biases the downshift linkage to take up the slack in the second lost motion linkage and to follow the throttle levers in the closing direction.

It is an object of the present invention to provide an internal combustion engine carburetor throttle valve control comprising a vehicle throttle pedal linkage for normally controlling the position of the throttle valve and a vehicle brake pedal actuated vacuum operated throttle return linkage for providing a backup force for returning the throttle valve to its idle position in the event the throttle pedal linkage should be prevented from moving in a throttle closing direction.

It is another object of the present invention to provide an internal combustion engine carburetor throttle valve control wherein a first throttle lever is fixed to a throttle shaft and is spring biased to normally move conjointly with a second throttle lever that is in the vehicle throttle pedal linkage for normally controlling the throttle valve and wherein the first lever is pivoted in a throttle closing direction by a vacuum motor actuated with engine vacuum communicated when a vehicle brake pedal opens a vacuum valve.

It is another object of the present invention to provide a throttle control of the foregoing type wherein one of the throttle levers normally moves a transmission downshift linkage for controlling the downshift of an automatic transmission from a higher to a lower ratio when the throttle valve is opened by the throttle pedal linkage, the transmission downshift linkage including a lost motion linkage for permitting normal movement of the throttle levers in a closing direction should the downshift linkage be prevented from moving and a spring causing the downshift linkage to follow and bias the one throttle lever in the throttle closing direction.

These and other objects and features of the present invention will become more apparent with reference to the following description taken in conjunction with the accompanying drawings wherein:

FIG. 5 is an enlarged perspective view of a portion of the throttle control of FIG. 1 operating normally;

FIG. 6 is an enlarged view of a portion of the throttle control of FIG. 1 not operating normally; and FIG. 7 is a view of a portion of the throttle control of FIG. 5 taken along view 7—7 thereof.

Figure 1:
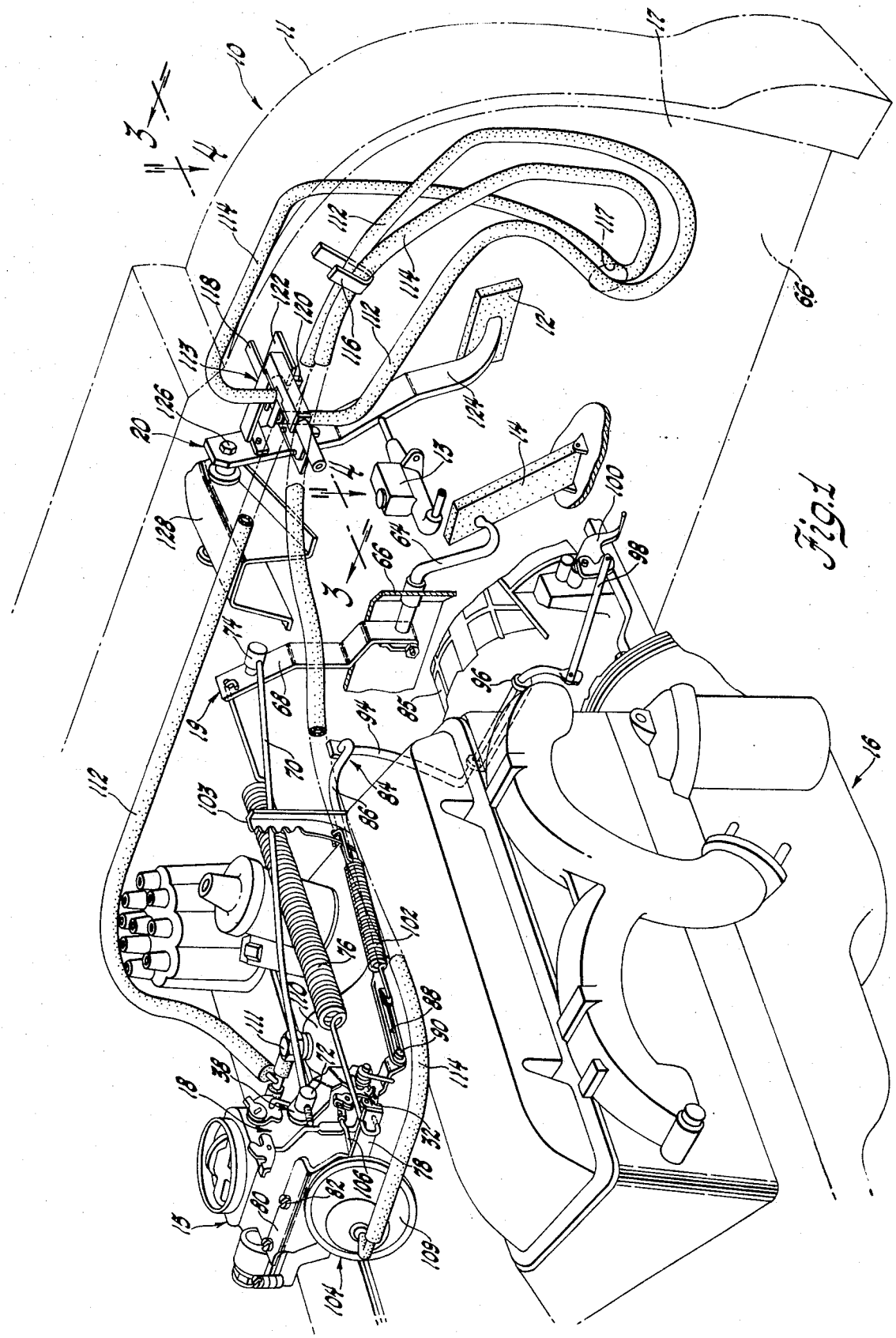
FIG. 1 is a perspective view of a throttle control provided in accordance with the present invention for controlling an engine of a vehicle.

With reference now to FIG. 1, there is shown a vehicle 10 having in a driver's compartment 11 a vehicle brake pedal 12 for controlling a vehicle brake system 13 and a vehicle throttle pedal 14 for normally controlling the flow of fuel through a carburetor 15 to an internal combustion engine 16 located in an engine compartment 17. Brake pedal 12 and throttle pedal 14 are both a part of a throttle control 18 for controlling a pair of throttle valves in carburetor 15, throttle pedal 14 being a part of a throttle pedal linkage 19 for normally controlling the position of the throttle valves and brake pedal 12 being a part of brake actuated throttle return system 20 described in greater detail below for returning the throttle valves to their idle position should brake pedal 12 be actuated when normal movement of throttle linkage 19 is prevented.

Figure 2:
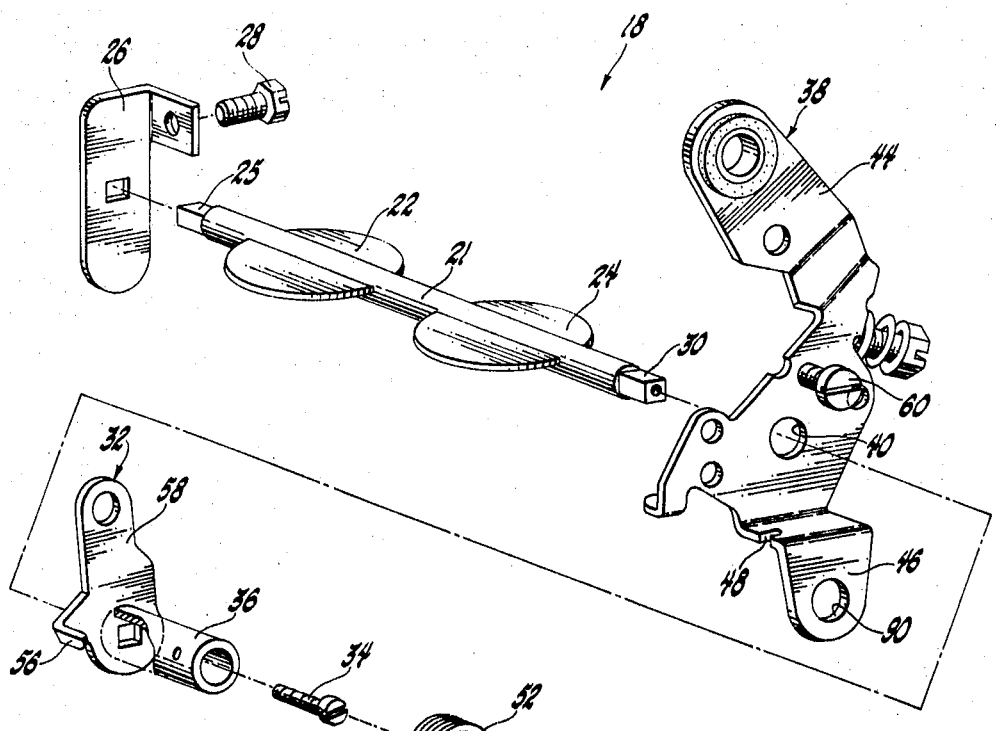
FIG. 2 is an exploded assembly view of a portion of the throttle control of FIG. 1.

As may be better understood with reference to FIG. 2, throttle control 18 includes a throttle shaft 21 that pivotably supports a pair of throttle valves 22 and 24 in a throttle bore of carburetor 15. Shaft 21 is keyed by a key 25 at one end thereof to a slow idle lever 26 having a slow idle adjustment screw 28 threadably engaged therein for abutting against a slow idle stop (not shown) jutting from the exterior of carburetor 15. To rotate shaft 21, the other end thereof is keyed by a key 30 to a first throttle lever 32 and is fastened directly thereto by a screw 34 inserted through a sleeve 36 extending axially away from first throttle lever 32 along the axis of shaft 21. A second throttle lever 38 is loosely supported by shaft 21 at a central bore 40 between throttle valve 24 and first throttle lever 32 and has a pair of arms 44 and 46 extending radially from shaft 21. Arm 46 has a slot 48 for engaging one end 50 of a scissor type coupling spring 52, the other end 54 of which engages a tang 56 extending axially from first throttle lever 32. Scissor coupling spring 52 biases throttle levers 32 and 38 in opposite directions about throttle shaft 21 until an arm 58 extending radially from first throttle lever 32 abuts a stop screw 60 threadably secured in arm 44 of second throttle lever 38. Spring 52 thus biases first throttle lever 32, and there-through throttle shaft 21 and throttle valves 22 and 24, to normally pivot conjointly with second throttle lever 38.

For connecting throttle pedal 14 with second throttle lever 38, throttle linkage 19 comprises as shown in FIG. 1, a first pedal lever 64 pivotably supported from a vehicle firewall 66 separating driver's compartment 11 from engine compartment 17, a second pedal lever 68 connected to first pedal lever 64, and a throttle rod 70 is swivably connected between arm 44 of second throttle lever 38 and second pedal lever 68 by swivel pins 72 and 74. Upon the application of actuating force to throttle pedal 14, throttle linkage 19 normally pivots second throttle lever 38 between an idle position 38' seen in FIG. 5 and at which the speed of engine 16 is normally in idling speed and a full open position 38" seen in FIG. 6 where the speed of engine 16 may be greater than the idling speed.

Throttle linkage 19 also includes a return spring 76 connected between second pedal lever 68 and a suitable anchor such as a tang 78 extending from a mounting bracket 80 secured to carburetor 15 by a screw 82. Return spring 76 normally biases throttle rod 70 in a leftward throttle closing direction as viewed in FIGS. 1, 5, 6 and 7 so as to normally return second throttle lever 38 to its idle position 38' and reduce the of engine 16 to the idling speed upon the removal of the actuating force from accelerator pedal 14.

Also connected to follow second throttle lever 38 is a transmission downshift linkage 84, also known as the "TV" linkage, for controlling the downshifting from a high to a lower drive of an automatic transmission 85 powered by engine 16 when the throttle valves 22 and 24 are suddenly opened. The TV linkage 84 comprises an upper downshift rod 86 including a lost motion section 88 that slidably engages a pin 90 secured in an aperture 92 in second throttle lever arm 44, a second downshift rod 94 pivotably connected to the upper rod 86 and pivotably mounted on engine 16 by a TV bracket 96, and a lower downshift rod 98 that is pivotably connected between rod 94 and a bell crank downshift lever 100 pivotably secured to automatic transmission 85. As throttle pedal 14 is suddenly actuated to open throttle valves 22 and 24, downshift lever 100 is pivoted in a counterclockwise direction as viewed in FIG. 1 by pivoting second throttle lever 38 in a clockwise direction to cause pin 90 to move upper downshift rod 86 leftward. Such leftward movement causes the counterclockwise rotation of second downshift rod 94 and a rightward movement of lower downshift rod 98.

As may be better understood with reference to FIG. 1, a lost motion slot 88 is provided in upper downshift rod 86 to permit pin 90 to move in a throttle closing direction with the removal of the actuating force from pedal 14 even if TV linkage 84 is prevented from normally following the motion of pin 90, as suggested by the intermediate position of pin 90 in slot 88 in FIG. 6. Spring 76 then returns throttle valves 22 and 24 to the idle position even while TV linkage 84 is in a leftwardly extending downshift position as the result of a prior actuation of throttle pedal 14. However, as best seen in FIG. 5, to normally maintain the left end of lost motion section 88 in self-engagement with pin 90 and also to bias second throttle lever 38 in the counterclockwise throttle closing direction thereby aiding the bias of return spring 76, a TV linkage spring 102 is connected between upper downshift rod 86 and a bracket 103 mounted on engine 16.

With the exception of the spring coupled first and second throttle levers 32 and 38 and the brake actuated throttle return system 20, to be described shortly, the throttle control 18 and TV linkage 84 heretofore described may be of the conventional type provided on certain 1968 passenger cars produced by the General Motors Corporation.

As may be better understood with reference to FIGS. 1 and 7, brake actuated throttle return system 20 includes a pressure differential operated vacuum motor 104 mounted on bracket 80 by a nut 81 and having an actuator rod 105 connected to first throttle lever arm 58 by a swivably connected connecting rod 106, one end of which is free to slide in a lost motion slot 107 provided actuator rod 105.

Figure 3:
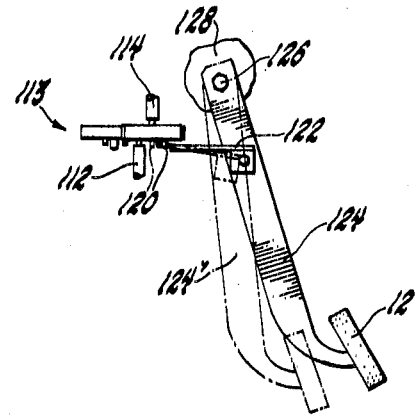
FIG. 3 is a side view of a portion of the throttle control of FIG. 1 taken along view 3—3 thereof.

To permit actuation of vacuum motor 104, the right or atmospheric side 108 thereof is vented to atmosphere. The left or vacuum side 109 is supplied with engine vacuum available in a branch of induction passage 110 through a fitting 111, a first vacuum line 112, a vacuum valve 113 when opened by brake pedal 12, and a second vacuum line 114. Vacuum lines 112 and 114 are supported on firewall 66 by a bracket 116 and enter the driver's compartment 11 through a suitable firewall opening 117. Vacuum valve 113 is mounted on a strut 118 in the driver's compartment 11 and has an actuating tab 120 that is engageable by an L-shaped member 122 secured to a brake lever 124. As seen in FIG. 3, brake lever 124 is pivotable at a pivot 126 between a non-actuated position shown solid and an actuated position 124' shown dotted relative to another driver compartment mounted strut 128. When lever 124 is actuated by the application of force to a vehicle brake pedal 12, L-shaped member 122 actuates tab 120 to open normally closed vacuum valve 113 so that engine vacuum is communicated from induction passage 110 through vacuum lines 112 and 114 to the vacuum side 109 of vacuum motor 104, the location of member 122 on lever 124 being adjustable to permit valve 113 to be opened at a desired point in the travel of lever 124. At such point, connecting rod 106 is retracted leftwardly as seen in FIG. 7 to pivot first throttle lever arm 58 in a counterclockwise throttle closing direction until slow idle adjustment screw 28 abuts against the stop projecting from the side of the carburetor 15. Moreover, upon vacuum valve actuation, actuating rod 105 is retracted with a force sufficient to overcome the bias of coupling spring 52 should second throttle lever 38 be prevented from moving conjointly with first throttle lever 32.

Figure 4:
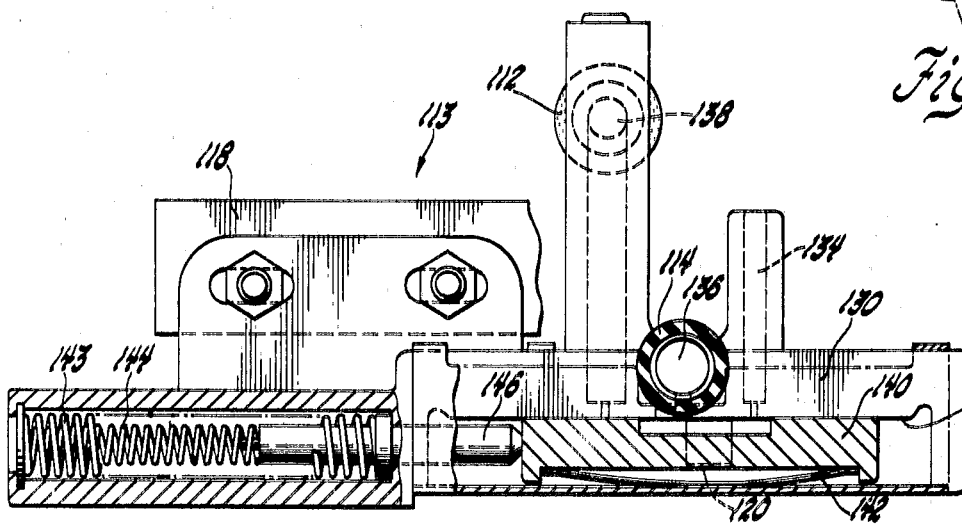
FIG. 4 is an enlarged view of a portion of the throttle control of FIG. 1 partially broken away and taken along view 4—4 thereof.

Vacuum valve 113, as may be better understood with reference to FIG. 4, comprises a valve body 130 having a valve surface 132 ported to a vent passage 134, a vacuum motor passage 136 communicating with the vacuum side 109 through vacuum line 114, and a vacuum source passage 138 communicating with induction passage 110 through vacuum line 112. Integral with actuating tab 120 is a slidable member 140 that is biased between valve body 130 and valve surface 132 by a flat spring 142. Springs 143 and 144 are provided to bias a plunger 146 and slidable member 140 rightwardly as seen in FIG. 4 so that actuating tab 120 thereof normally engages an end of a slot (not shown) in valve body 130 when brake pedal 12 is not actuated. In this position, slidable member 140 normally blocks source passage 138 while also normally venting the vacuum slide 109 of vacuum motor 104 through passages 136 and 134. Actuation of brake pedal 12 causes member 122 mounted thereon to engage actuating tab 120 to move slider 140 leftwardly as viewed in FIGS. 1, 3 and 4 against the bias of springs 143 and 144 to close vent passage 134 while opening vacuum source passage 138 so that it communicates with vacuum motor passage 136 and thereby causes the leftward retraction of connecting rod 106.

In normal operation of throttle control 18, second throttle lever 38 is pivoted from its idle position 38' shown in FIG. 5 in a clockwise throttle opening direction when an actuating force is applied to throttle pedal 14 sufficient to overcome the return bias applied to second throttle lever 38 by return spring 76 and TV spring 102. When such actuating force is applied to throttle pedal 14 without the application of the actuating force to brake pedal 12, second throttle lever 38 is pivoted from its idle position 38' shown in FIG. 5 toward its fully open position 38'' shown in FIG. 6. This motion is transmitted to throttle shaft 21 through first throttle lever 32 affixed thereto while connecting rod 106 connected to first throttle lever arm 58 is free to slip in lost motion section 107 of actuating rod 105.

Actuation of brake pedal 12 whether throttle pedal linkage 19 is free to move in a closing direction or not causes the application of engine vacuum to vacuum motor 104 through vacuum valve 113. Actuating rod 105 of vacuum motor 104 is thereby retracted to pivot first throttle lever in the counterclockwise direction returning throttle valves 22 and 24 to their idle position. Should second throttle lever 38 be free to move conjointly with first throttle lever 32, the bias applied to first throttle lever 32 through vacuum motor 104 aids the closing bias of return spring 76 on second throttle lever 38. However, should throttle linkage 19 upon release of throttle pedal 14 be prevented from returning the throttle valves to their idle position, the actuation of vacuum motor 104 applies to first throttle lever 32 a sufficient bias against the sense of coupling bias of coupling spring 52 so as to pivot first throttle lever 32 relative to second throttle lever 38 and return throttle shaft 21 to its idle position irrespective of the position of throttle linkage 19.

In order to provide a triply redundant system for closing the throttle valves 22 and 24 in another embodiment of the present invention, TV engaging pin 90 rather than being secured to second throttle lever 38 is secured to first throttle lever 32 so that upper downshift rod 86 follows the motion of first throttle lever 32 rather than second throttle lever 38. Then, should any element of brake actuated vacuum operated linkage 20 or any element of throttle pedal actuated linkage 19 become disconnected with throttle valves 22 and 24 not returned to their idle position, TV spring 102 would then normally be operative to pivot first throttle lever 32 in a throttle closing direction to close the throttle valves. In this alternative, the effect of the bias of TV spring 102 on first throttle lever 32 is selected to be less than the effect of coupling spring 52 so that normal application of actuating force to throttle pedal 14 permits first and second throttle levers 32 and 38 to move conjointly rather than relative to each other about throttle shaft 21 as might be the case should the effect of the bias of TV spring 102 be greater than that of coupling spring 52.

Having described several embodiments of the present invention, it is understood that the specific terms and examples are employed in a descriptive sense only and not for the purpose of limitation. Other embodiments of the invention, modifications, thereof and alternatives thereto may be used. I therefore aim in the appended claims to cover such modifications and changes as fall within the true spirit and scope of my invention.

What I claim as new and desire to secure by Letters Patent of the United States is:

1. In a vehicle:
   a. an internal combustion engine providing a source of engine vacuum;
   b. a carburetor having a throttle valve means pivotable between a full open position and an idle position;
   c. a first throttle lever connected to pivot said throttle valve means and a second throttle lever pivotable relative to the first throttle lever;
   d. coupling spring means for coupling said first and second throttle levers to normally pivot conjointly and alternatively yielding to permit said first throttle lever to move relative to said second throttle lever in a throttle closing direction towards said idle position when said second throttle lever is prevented from moving conjointly with the first throttle lever;
   e. a vehicle throttle pedal linkage means for normally pivoting said second throttle lever in a throttle opening direction towards said full open position and including return spring means connected to one of said throttle levers for normally biasing said one throttle lever in said throttle closing direction;
   f. a vehicle braking system for effecting vehicle braking and including a vehicle brake pedal having an actuated condition when actuated by the operator of said vehicle and a non-actuated condition when not actuated by the operator; and
   g. brake actuated pneumatically operated throttle return means including pressure differential operated motor means operatively connected with said first throttle lever, said throttle return means operable in a normal condition to normally permit said first and second throttle levers to move conjointly and alternatively in a throttle return condition to pivot said first throttle lever in said throttle closing direction to return said throttle valve means to said idle position, conduit means for communicating said source of engine vacuum and said pressure differential operated motor means, and brake actuated valve means operatively connected with said vehicle brake pedal and said conduit means to normally establish said normal condition when said vehicle brake pedal is in said non-actuated condition and to establish said throttle return condition when said brake pedal is in said actuated condition.

2. In a vehicle:
   a. an internal combustion engine providing a source of engine vacuum;
   b. a carburetor having a throttle valve means including a throttle shaft pivotable between a full open position and an idle position;
   c. a first throttle lever connected to said throttle shaft and a second throttle lever pivotable about said throttle shaft relative to the first throttle lever;
   d. coupling spring means for coupling said first and second throttle levers in opposite directions about said shaft so as to normally pivot conjointly and alternatively yielding to permit said first throttle lever to move relative to said second throttle lever in a throttle closing direction towards said idle position when said second throttle lever is prevented from moving conjointly with the first throttle lever;

e. a vehicle throttle pedal linkage means for normally pivoting said second throttle lever in a throttle opening direction towards said full open position and including return spring means connected to said second throttle lever for normally biasing said second throttle lever in said throttle closing direction;

f. a vehicle braking system for effecting vehicle braking and including a vehicle brake pedal having an actuated condition when actuated by the operator of said vehicle and a non-actuated condition when not actuated by the operator; and g. brake actuated pneumatically operated throttle return means actuated when said brake pedal is in said actuated condition and including vacuum operated motor means operatively connected with said first throttle lever to permit normal movement of said first and second throttle levers, said throttle return means operable in a normal condition to normally permit said first and second throttle levers to move conjointly and alternatively in a throttle return condition to pivot said first throttle lever in said throttle closing direction to return said throttle shaft to said idle position when one of said throttle pedal linkage and said second throttle lever is prevented from moving in said throttle closing direction, conduit means for communicating said source of engine vacuum and said vacuum operated motor means when said vacuum motor means is in one of said normal and said throttle return conditions, and brake actuated valve means directly connected with said vehicle brake pedal and operatively connected with said conduit means to normally establish said normal condition when said brake pedal is in said non-actuated condition and to establish said throttle return condition when said brake pedal is in said actuated condition, said brake actuated valve means normally communicating vacuum operated motor means and atmospheric pressure when said vehicle brake pedal is in said non-actuated condition and communicating said source of engine vacuum and said vacuum operated motor means when said brake pedal is in said actuated condition.

3. In a vehicle:

a. an internal combustion engine providing a source of engine vacuum;

b. a carburetor having a throttle valve means pivotable between a full open position and an idle position;

c. a first throttle lever connected to pivot said throttle valve means and a second throttle lever pivotable relative to the first throttle lever;

d. coupling spring means for coupling said first and second throttle levers to normally pivot conjointly and alternatively yielding to permit said first throttle lever to move in a throttle closing direction toward said idle position relative to said second throttle lever when said second throttle lever is prevented from moving conjointly with the first throttle lever;

e. vehicle throttle pedal linkage means for normally pivoting said second throttle lever in a throttle opening direction towards said full open position and including return spring means connected to one of said throttle levers for normally biasing said one lever in said throttle closing direction.

f. transmission downshift linkage means operatively connecting said second throttle lever and an automatic vehicle transmission having a high and a lower drive ratio for controlling the downshifting of said transmission from said high to said lower drive ratio when said throttle valve means is pivoted towards said full open position;

g. a vehicle brake system for effecting vehicle braking and including a vehicle brake pedal having an actuated condition when actuated by the operator of said vehicle and a non-actuated condition when not actuated by the operator; and h. brake actuated pneumatically operated throttle return means including vacuum operated motor means operatively connected with said first throttle lever, said throttle return means operable in a normal condition to normally permit said first and second throttle levers to move conjointly and alternatively in a throttle return condition to pivot said first throttle lever in said throttle closing direction to return said throttle valve means to said idle position when said second throttle lever is prevented from moving in said throttle closing direction, conduit means for communicating said source of engine vacuum and said vacuum operated motor means, and brake actuated valve means operatively connected with said vehicle brake pedal and with said conduit means to nornally establish said normal condition when said vehicle brake pedal is in said non-actuated condition and to establish said throttle return condition when said brake pedal is in said actuated condition.

4. In a vehicle: normal a. an internal combustion engine providing a source of engine vacuum;

b. a carburetor having a throttle valve means including a throttle shaft pivotable between a full open position and an idle position;

c. a first throttle lever connected to pivot said throttle valve means and a second throttle lever pivotable about said throttle valve means relative to the first throttle lever;

d. coupling spring means for coupling said first and second throttle levers in opposite directions about said shaft so as to normally pivot conjointly and alternatively yielding to permit said first throttle lever to move relative to said second throttle lever in a throttle closing direction towards said idle position when said second throttle lever is prevented from moving conjointly with the first throttle lever;

e. throttle pedal linkage means for normally pivoting said second throttle lever in a throttle opening direction towards said full open position and including return spring means connected to said second throttle levers for normally biasing said second lever in said throttle closing direction;

f. transmission downshift linkage means operatively connecting said first throttle lever and an automatic vehicle transmission having a high and a lower drive ratio for controlling the downshift of said automatic transmission from said high to said lower drive ratio when said throttle valve means is pivoted towards said full open position, said transmission downshift linkage means including a lost motion linkage providing slack for permitting normal movement of said throttle valve means when said transmission downshift linkage is prevented from moving in the closing direction with said first throttle lever;

g. downshift spring means for urging said downshift linkage to normally take up said slack in said lost motion linkage and cause said downshift to normally follow said first throttle lever in the throttle closing direction, said downshift spring means applying to said first throttle lever a bias acting against and being less than the bias of said coupling spring so as to normally prevent relative rotation between said throttle levers when said second throttle lever is pivoted in said throttle opening direction;

h. a vehicle braking system for effecting vehicle braking and including a vehicle brake pedal having an actuated condition when actuated by the operator of said vehicle and a non-actuated condition when not actuated by the operator; and i. brake actuated pneumatically operated throttle return means including a vacuum operated motor means operatively connected with said vehicle brake pedal and with said first lever, said throttle return means operable in a normal condition to normally permit said first and second throttle levers to move conjointly between said idle and full open positions and alternatively in a throttle return condition to pivot said first throttle lever in said throttle closing direction to return said throttle valve means to said idle position, conduit means for communicating said source of engine vacuum and said vacuum operated motor means, and brake actuated valve means operatively connected with said conduit means to normally establish said normal condition by communicating said motor means and atmospheric pressure when said brake pedal is in said non-actuated condition and to establish said throttle return condition by communicating said source of engine vacuum and said vacuum motor means when said brake pedal is in said actuated condition.

5. In a vehicle:

a. an internal combustion engine providing a source of engine vacuum;

b. a carburetor having a throttle valve means including a throttle shaft pivotable between a full open position and an idle position;

c. a first throttle lever connected to pivot said throttle valve means and a second throttle lever pivotable about said throttle valve means relative to the first throttle lever;

d. coupling spring means for coupling said first and second throttle levers in opposite directions about said shaft so as to normally pivot conjointly and alternatively yielding to permit said first throttle lever to move relative to said second throttle lever in a throttle closing direction towards said idle position when said second throttle lever is prevented from moving conjointly with said first throttle lever;

e. throttle pedal linkage means for normally pivoting said second throttle lever in a throttle opening direction towards said full open position and including return spring means connected to said second throttle lever for normally biasing said second lever in said throttle closing direction;

f. transmission downshift linkage means operatively connecting said second throttle lever and an automatic vehicle transmission having a high and a lower drive ratio for controlling the downshift of said automatic transmission from said high to said lower drive ratio when said throttle valve means is pivoted towards said full open position, said transmission downshift linkage means including a lost motion linkage providing slack for permitting noramal movement of said throttle valve means when said transmission downshift linkage is prevented from moving in the closing direction with said second throttle;

g. downshift spring means for urging said downshift linkage to normally take up said slack in said lost motion linkage and cause said downshift to normally follow said second throttle lever in the throttle closing direction, said downshift spring means applying to said second throttle lever a bias aiding the bias of said return spring means;

h. a vehicle braking system for effecting vehicle braking and including a vehicle brake pedal having an actuated condition when actuated by the operator of said vehicle and a non-actuated condition when not actuated by the operator; and i. brake actuated pneumatically operated throttle return means actuated when said vehicle brake pedal is in said actuated condition and including a vacuum operated motor means operatively connected with said vehicle brake pedal and with said first lever, said throttle return means operable in a normal condition to normally permit said first and second throttle levers to move conjointly between said idle and full open position and alternatively in a throttle return condition to pivot said first throttle lever in said throttle closing direction to return said throttle valve means to said idle position, conduit means for communicating said source of engine vacuum and said vacuum operated motor means when said vacuum motor means is in one of said normal and throttle return conditions, and brake actuated valve means directly connected with said vehicle brake pedal and operatively connected with said conduit means to normally establish said normal condition by communicating said vacuum motor means and atmospheric pressure when said brake is in said non-actuated condition and to establish said throttle return condition by communicating said source of engine vacuum and said vacuum motor means when said brake pedal is in said actuated condition.

* * * * *